US010963954B1

(12) United States Patent
Orzechowski (10) Patent No.: US 10,963,954 B1
(45) Date of Patent: Mar. 30, 2021

(54) ELECTRONIC CIRCUITRY FOR VALUATION AND AGGREGATION OF VALUES OF CLIENT ENTITIES WITH TEMPORAL RESTRICTIONS

(71) Applicant: U.S. Bank National Association, Cincinnati, OH (US)

(72) Inventor: Michael Orzechowski, Hartland, WI (US)

(73) Assignee: U.S. Bank National Association, Cincinnati, OH (US)

( * ) Notice: Subject to any disclaimer, the term of this patent is extended or adjusted under 35 U.S.C. 154(b) by 916 days.

(21) Appl. No.: 14/959,325

(22) Filed: Dec. 4, 2015

Related U.S. Application Data (62) Division of application No. 13/324,528, filed on Dec. 13, 2011, now abandoned.

(60) Provisional application No. 61/424,512, filed on Dec. 17, 2010.

(51) Int. Cl.
G06Q 40/00 (2012.01)

(52) U.S. Cl.
CPC .................................. G06Q 40/00 (2013.01)

(58) Field of Classification Search
CPC ...................................................... G06Q 40/00
See application file for complete search history.

(56) References Cited

U.S. PATENT DOCUMENTS

2005/0197937 A1* 9/2005 Fanous .................. G06Q 10/10
705/35

OTHER PUBLICATIONS

Cogswell, Jeff; Mueller, John Paul. C++ All-in-One for Dummies®, 2nd Edition. Release Date: Aug. 2009. Publisher: For Dummies. 2nd Edition. Table of Contents and Chapter 3. 45 pages.*
Cogswell, Jeff; Mueller, John Paul. C++ All-in-One for Dummies®, 2nd Edition. Release Date: Aug. 2009. Publisher: For Dummies. 2nd Edition. Table of Contents and Chapter 3. 45 pages. (Year: 2009).*
International framework for liquidity risk measurement, standards and monitoring. Basel Committee on Banking Supervision, Consultation Document, p. 1-36. (Dec. 2009). (Year: 2009).*

(Continued)

*Primary Examiner* — Florian M Zeender
*Assistant Examiner* — Joseph M Mutschler
(74) *Attorney, Agent, or Firm* — Crawford Maunu PLLC (57) ABSTRACT

Embodiments include apparatuses and methods for aggregating temporal restricted values for accounts of a plurality of client entities. Apparatus embodiments include a memory circuit, a current value circuit, a client value circuit, a temporal value circuit, an aggregation circuit, and a net value circuit. The current value circuit determines current value data for accounts attributed to the entity ID. For each client entity ID, the client value circuit determines a participation condition for a value attributable to the client entity ID. The temporal value circuit identifies the participation condition indicates accounts of the client entity are temporally restricted and computes a temporal value corresponding the value. The aggregation circuit aggregates the computed temporal values for the client entity IDs to determine an aggregate temporal value. The net value circuit computes a net value of accounts for the entity based on the determined current value and the aggregated temporal value.

15 Claims, 3 Drawing Sheets

(56) References Cited

OTHER PUBLICATIONS

Basel iii—Basel iii Accord: The new Basel iii framework. http://www.basel-iii-accord.com/ (download Oct. 25, 2010) 22 pgs. (Year: 2010).*

Basil Committee on Banking Supervision International Convergence of Capital Measurement and Capital Standards, a Revised Framework Comprehensive Version. Jun. 2006. pp. 1-347. (Year: 2006).*

"International framework for liquidity risk measurement, standards and monitoring." Basel Committee on Banking Supervision, Consultation Document, p. 1-36. (Dec. 2009).

"Basel iii—Basel iii Accord: The new Basel iii framework." http://www.basel-iii-accord.com/ (download Oct. 25, 2010) 22 pgs.

Basil Committee on Banking Supervision International Convergence of Capital Measurement and Capital Standards, a Revised Framework Comprehensive Version. Jun. 2006. pp. 1-347.

\* cited by examiner

ELECTRONIC CIRCUITRY FOR VALUATION AND AGGREGATION OF VALUES OF CLIENT ENTITIES WITH TEMPORAL RESTRICTIONS

FIELD

Aspects of the present invention are directed to electronic circuitry for valuation and aggregation of values of client entities with temporal restrictions, with more specific aspects directed to assignment of types of accounts of client entities and aggregated valuation for account types of client entities based upon temporal constraints.

SUMMARY

Various example embodiments are directed to electronic circuitry for valuation and aggregation of values of client entities with temporal restrictions. In accordance with an example embodiment, an available accounts value is computed based upon accounts available to an entity. The available accounts computation is carried out based upon a determination of a temporal (time-based) limitation upon the accounts relative to the availability of the accounts for access by clients on behalf of which the accounts, or rights to the accounts, are held.

A more particular example embodiment is directed to an apparatus for valuating and aggregating values for accounts that are temporally restricted and attributed to a plurality of client entities. The apparatus includes a memory circuit, a current value circuit, a client value circuit, a temporal value circuit, an aggregation circuit, and a net value circuit. The memory circuit has entity data indicative of a current value for accounts attributed to an entity identification (ID) and client data for the plurality of client entities having attributed accounts controlled by an entity. The entity ID is indicative of the entity and each client entity respectively has a client entity ID. The current value circuit determines current value data for accounts attributed to the entity ID using the entity data. For each of the client entity IDs, the client value circuit determines a participation condition for a value attributable to the client entity ID using valuation data and the client data for the respective client entity ID. The temporal value circuit identifies the participation condition indicates accounts of the corresponding client entity are temporally restricted. And, in response, the temporal value circuit executes a temporal funding function, using the value attributable to the client entity ID and a temporal constraint as inputs, to compute a temporal value corresponding to at least a portion of the value attributable to the client entity ID for which access to the accounts by the corresponding client entity is temporally restricted. The aggregation circuit aggregate the computed temporal values for the client entity IDs to determine an aggregate temporal value for the entity ID. And, the net value of available accounts is computed for the entity, by the net value circuit, based on the determined current value and the aggregated temporal value.

The above overview is not intended to describe each embodiment or every implementation of the present disclosure. The figures, detailed description and claims that follow also exemplify various embodiments.

FIGURES

Various example embodiments may be more completely understood in consideration of the following detailed description in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

Aspects of the present invention are believed to be applicable to a variety of different electronic circuitry for valuation and aggregation of values of client entities with temporal restrictions.

Determining liquidity values in the financial industry has been challenging and also highly important to various regulatory functions. Recent financial crises have been attributed to a liquidity shortfall in relevant banking systems. Liquidity shortfalls can contribute to a myriad of problems for individuals, goods and services entities, financial entities, governments and others involved in aspects of the global economy.

While various regulatory approaches have been implemented, they have been challenging to operate in an effective manner. For instance, recent regulatory approaches have required financial entities to hold a minimum amount of liquid assets, and to report the same. However, meeting such standards and further ensuring an accurate computation relating to the standard can be difficult. For example, defining liquid assets and calculating run-off for cash outflows can be particularly challenging. These and other issues continue to pose challenges to the implementation of regulations in an accurate manner, and in particular, to the generation of information including data upon which such regulation can be based.

In the following discussion, various references are made to specific ratio-based terms such as the liquidity coverage ratio (LCR) and the net stable funding ratio (NSFR), in connection with one or more example embodiments. Aspects of these embodiments are directed to generating temporally-limited data using particular time periods, associated with the discussed terms including LCR and NSFR. As relevant to these periods, various embodiments are directed to similar approaches using other time periods. For instance, with embodiments directed to the computation of an LCR based upon a term of 30 days, similar approaches may be used in effecting computations relative to other terms.

According to an example embodiment, a temporally-limited valuation is computed as follows, using an approach for assigning a value to the stock of liquid assets, to gauge an entity's stock of liquid assets:

$$\text{Stock of liquid assets Net cash outflows over a pre-defined time period} \geq 100\%. \quad \text{(Equation 1)}$$

Net cash outflows are generally calculated by applying run-off rates to different funding sources, less any expected cash inflows for the time period, such as a 30-day period for a LCR application, or a 365-day period for a NSFR application. For general information regarding such an approach, and for specific information regarding approaches to which one or more example embodiments are directed, reference may be made to the Basel I, Basel II and Basel III accords, and to the "International Framework for Liquidity Risk Measurement, Standards and Monitoring," all of which are issued by the Basel Committee on Banking Supervision (BCBS), of Basel, Switzerland, and which are also fully incorporated herein by reference.

In some implementations, the liquid assets in equation 1 include cash, central bank reserves, and sovereign debt. A second level of assets that may be included with the liquid assets above include government-sponsored enterprise (GSE) obligations, and non-financial corporate and covered bonds above a specified rating (e.g., AA- or above). Some assets are rated (e.g., to devalue the assets), and the amount of second-level assets included with the liquid assets can be limited (e.g., to no more than 40% of liquid assets).

The net cash outflows in Equation 1 may be computed by assigning run-off rates to each source of funding, which are designed to simulate a severe stress scenario. Such a run-off rate may, for example, reflect an amount of funding maturing in a time window that won't roll over. Many embodiments are directed to characterizing funding sources and, in turn, setting a run-off rate based upon the characterization.

Other embodiments are directed to computing a valuation as discussed above, in connection with a variety of balance sheet valuations, such as those involving puttable offerings in which a repayment delay-type period is set, with the period often referred to as a put notification time, after which a customer may put all or a portion of a balance back to an issuer or otherwise execute the puttable option. In various implementations, the process is used for different ratios, with the length of the put aspect of the valuation set differently for different ratios.

In some implementations, a puttable offering is a product in which the owner or holder of the product has an option to sell (e.g., put back) a product at a predetermined price until a certain date. One such implementation is directed to shares of stock in which an owner/holder can purchase a put option to guarantee the holder the right to sell the stock at a particular value until a particular time period lapses. If the value of the shares drops, the holder of the puttable option may sell the shares at a put price. The obligated purchaser may, for example, be an issuer or another entity/individual offering the put option. The valuation of the puttable product is carried out accordingly. Similar options may be carried out with bonds and other products. Accordingly, the timing for exercising or otherwise funding a put option may be set according to a predetermined period as discussed above.

In some implementations, a delay feature or component as discussed herein has a selectable range (e.g., between about 31 calendar days and 18 months), that is set based on one or more of user input, the type of asset being assigned a value and a predefined valuation function that sets the put length based on one or more of a variety of factors. In some applications, the length of the put is set according to a type of product, with similar (or the same) products having different put lengths to suit particular applications or terms, such as interest terms assigned to the assets.

Certain embodiments are directed to a valuation approach in which funds are subject to a callable function, in which the owner of a callable product can purchase a financial product such as stocks or bonds for a predetermined value, if the purchase is made within a predefined time period. In this approach, the option is limited to a time period before a maturity date, such as the timing periods discussed above for LCR and NSFR. Such a callable product can be sold for a fee, with the seller incurring an obligation to honor the terms of the callable product.

Another embodiment is directed to valuating and/or controlling term product offerings, for products such as (but not limited to) Eurodollar time deposits, certificates of deposit, repurchase agreements, bank notes, medium term notes, checking accounts, money market deposit accounts, and commercial paper. These products are created with a defined maturity date (e.g., 31 days to 10 years or longer). In some implementations, the holder (investor) is provided with a puttable option with the term product, such as to put the investment back to an issuer, or a callable option as discussed above. Where exempted, certain product offerings are not offered for such a put function.

Other embodiments are directed to open, or Until Further Notice (TFN) products. Such products include Eurodollar time deposits, repurchase agreements, commercial paper, money market demand accounts, savings accounts, and interest bearing demand deposit accounts. For these products, balances can be added to the investment at any time. Reductions in the balances are limited to time periods as discussed herein.

Still other embodiments are directed to processing sweep products subject to a deposit agreement. Such products include, for example, Eurodollar time deposits, repurchase agreements, commercial paper, money market demand accounts, savings accounts, and interest bearing demand deposit accounts. These products are similar to the open/TFN products discussed above, with the addition of a deposit/investment agreement. Under the deposit/investment agreement, the total balances of the customers are aggregated in one or many accounts, and the minimum balance is kept for a contractual term. Accounts may be added or closed, but in total, the minimum balance must be maintained. Accordingly, this balance is tracked and maintained across several accounts. Contractual terms can be held similarly to requirements for the term products as discussed above, such as a Commercial Paper in which a limitation of 270 is held based upon an SEC exemption limiting Commercial Paper to a maximum maturity of 270 days (such time periods may be set, eliminated or changed based upon a current state of applicable rules/laws).

Figure 1:
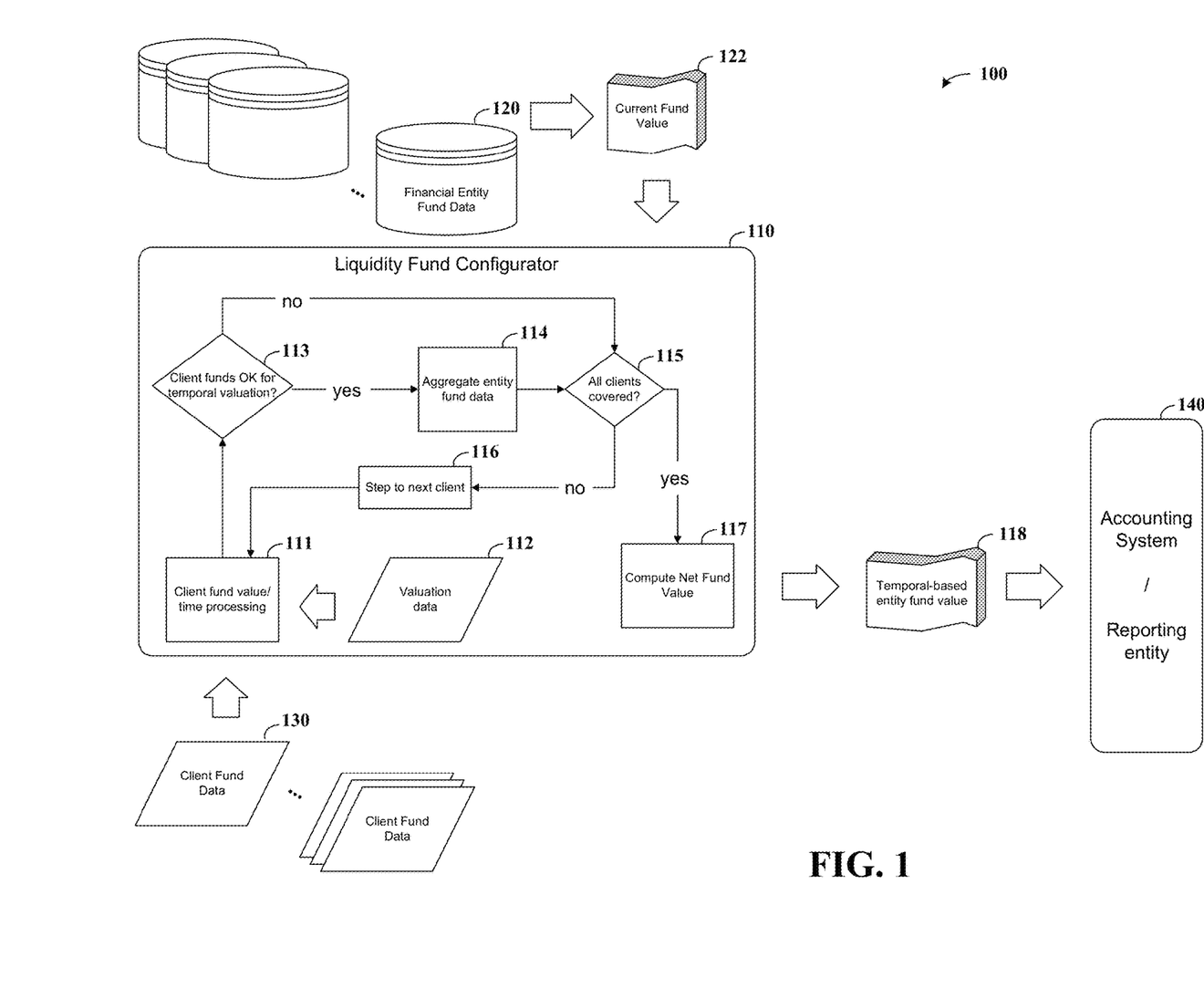
FIG. 1 shows a system and approach for determining a net value based upon temporal funding characteristics, according to an example embodiment of the present invention.

FIG. 1 shows a system 100 for determining a net value (e.g., net fund value) based upon temporal funding characteristics, according to another example embodiment of the present invention. The system 100 includes a liquidity fund configurator 110 that determines a temporal funding value using a current fund value 122 for the financial entity, as well as client fund data 130 for clients served by the financial entity. The current fund value 122 is optionally retrieved from a memory 120, which may be included as part of the system 100, as represented by example in FIG. 1. In certain embodiments, the client fund data 130 is also retrieved from a memory similar to memory 120, or stored with the current fund value 122 in the memory 120 as well.

The liquidity fund configurator 110 uses the input current fund value 122 and client fund data 130 to generate an output temporal-based entity fund value 118, which can be accomplished using one or more approaches as described herein. The temporal-based entity fund value 118 is provided to one or more of a variety of systems, such as an accounting system or a reporting entity system as represented by system 140.

In a more particular implementation, the liquidity fund configurator 110 generates the temporal-based entity fund value 118 as follows, with reference to various blocks implemented in a processor circuit (e.g., as executable software blocks). A client fund value/time-based block 111 uses valuation data 112, together with the client fund data 130, to generate information characterizing temporal aspects of the client fund data. This information may, for example, be generated as discussed herein using time-based access limitations to determine a temporal period during which a client to which the funds are designated cannot access the funds. Such a period may apply to a financial product such as those discussed above, with partial or total restricted access to the funds for a particular time period. Depending upon the time period in question (e.g., for a particular funding valuation), the period can be adjusted accordingly for use at block 111. The following process can be carried out for a multitude of different clients that the financial entity serves.

If some or all of the client funds are indicated as appropriate for a temporal valuation (e.g., the client's access to funds is restricted) at block 113, the funds are aggregated at block 114. This aggregation may involve, for example, aggregating a value for a current client for which funds are being evaluated together with other values for other clients that have been evaluated.

If all clients for the financial entity have been covered at block 115, a net fund value for the financial entity is computed at block 117 using the funds aggregated at block 114 plus a current value of funds attributed to the financial entity (e.g., funds that are owned by the financial entity). If all clients for the financial entity have not been covered at block 115, the process is stepped to a next client of the financial entity at block 116, and then returns to block 111 for determining a temporal fund value for the next client. Similarly, if client funds processed at block 111 do not include funds available for temporal funding at block 113, a determination as to whether all clients have been covered is also made at block 115. Once all funds for clients of the financial entity have been aggregated, the net fund value at block 117 is output as temporal-based net entity fund value data 118.

Figure 2:
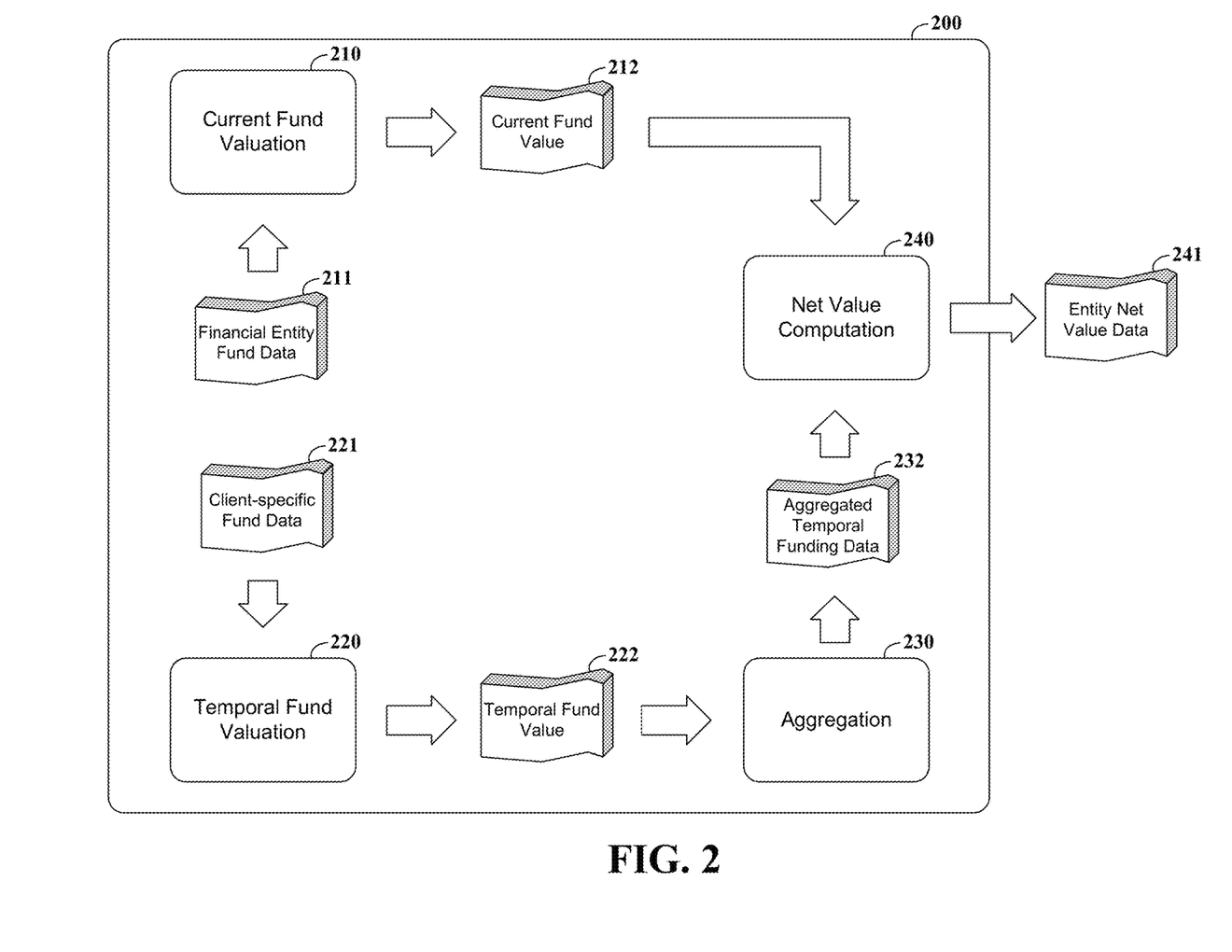
FIG. 2 shows a logic circuit for determining a net value based upon temporal funding characteristics, according to another example embodiment of the present invention.

FIG. 2 shows a logic circuit 200 for determining a net value (e.g., net fund value) based upon temporal funding characteristics, according to another example embodiment of the present invention. The net fund value is for a financial entity having a financial entity identification (ID), and is computed using temporally-constrained funds for a plurality of client entities having funds controlled by the financial entity under a temporal constraint, each client entity respectively having a client entity ID.

The logic circuit 200 includes a current fund value calculation block 210 that is configured to determine a current fund value for funds electronically attributed to the financial entity ID. Specifically, the current fund value calculation block 210 uses financial entity fund data 211, indicative of funds attributed to the financial entity for which the net fund value is being calculated (e.g., cash on hand, certain liquid assets), to determine a current cash or liquid fund type position of the financial entity. This determination is output as current fund value data 212 for the financial entity. With respect to both the financial entity ID and client entity ID and related funds attributed thereto, the funds may be attributed by, for example, storing data representing the funds in a location attributed to the particular ID or tagging the data representing the funds with data indicating the ID.

The logic circuit 200 also includes a temporal fund value calculation block 220 that is configured to determine an amount of temporal funds (if any) available to the financial entity for each of its clients. For each of the client entity IDs, the temporal fund value calculation block 220 executes a participation algorithm using client-specific fund data 221 as an input, to determine a participation condition for a fund value attributable to the client entity ID. In response to the participation condition indicating participation of the attributable fund value in a temporal funding computation, the temporal fund value calculation block 220 executes a temporal funding algorithm, using the fund value attributable to the client entity ID and a temporal constraint as inputs, to compute a temporal funding value corresponding to at least a portion of the fund value attributable to the client ID for which access to the funds by the corresponding client entity is temporally restricted. The temporal funding value is thus computed using funds designated to the client ID, which the client cannot access during a particular time period, and output by the temporal fund value calculation block 220 as temporal funding value data 222. The temporal fund value calculation block 220 generates this data 222 for each client of the financial entity for which a net fund value is calculated.

An aggregation block 230 aggregates the computed temporal funding values for the plurality of client entity IDs to calculate an aggregate temporal funding value for the financial entity ID. Corresponding aggregate temporal funding value data 232 is output and provided along with the current fund value data 212 to a net value block 240, which computes a net value of available funds for the financial entity based on the determined current fund value and the aggregated temporal funding value. This computed value is output as entity net value data 241 for the financial entity, which can be used as discussed herein.

As discussed above, various embodiments and implementations are directed to temporally-limited valuation that can be implemented using one or more of a variety of different types of financial products. The following products relate to those as may be known to those of skill in the art, and can be implemented accordingly (noting some of these are more specifically discussed with one or more embodiments above): Eurodollar Time Deposit, Certificates of Time Deposit, Commercial Paper, Repurchase Agreement, Bank Notes, Medium Term Notes, Money Market Demand Account, Sweep Products to Balance Sheet Offerings, Savings Account, Interest Bearing Demand Deposit Account.

The respective products may be priced based upon one or more factors as discussed above, such as those relating to temporal periods. Pricing may include, for example, one or more of: fixed pricing based upon term, indexed pricing spread to target federal funds, indexed pricing spread to the Libor index, and a managed rate based upon market conditions and funding needs. The effective maturity of products as discussed herein can be set based upon contractual terms defined, and may be processed according to a limited liquidity that is subject to a temporal period (e.g., a minimum 31 day put option for the LCR or 366 day put option for the NSFR). Accordingly, maturity may be set according to an open/TFN (Until Further Notice) term, a sweep product subject to a deposit/investment agreement, a term ranging from 31 days to 10 years, or a commercial paper limit of 270 days.

Figure 3:
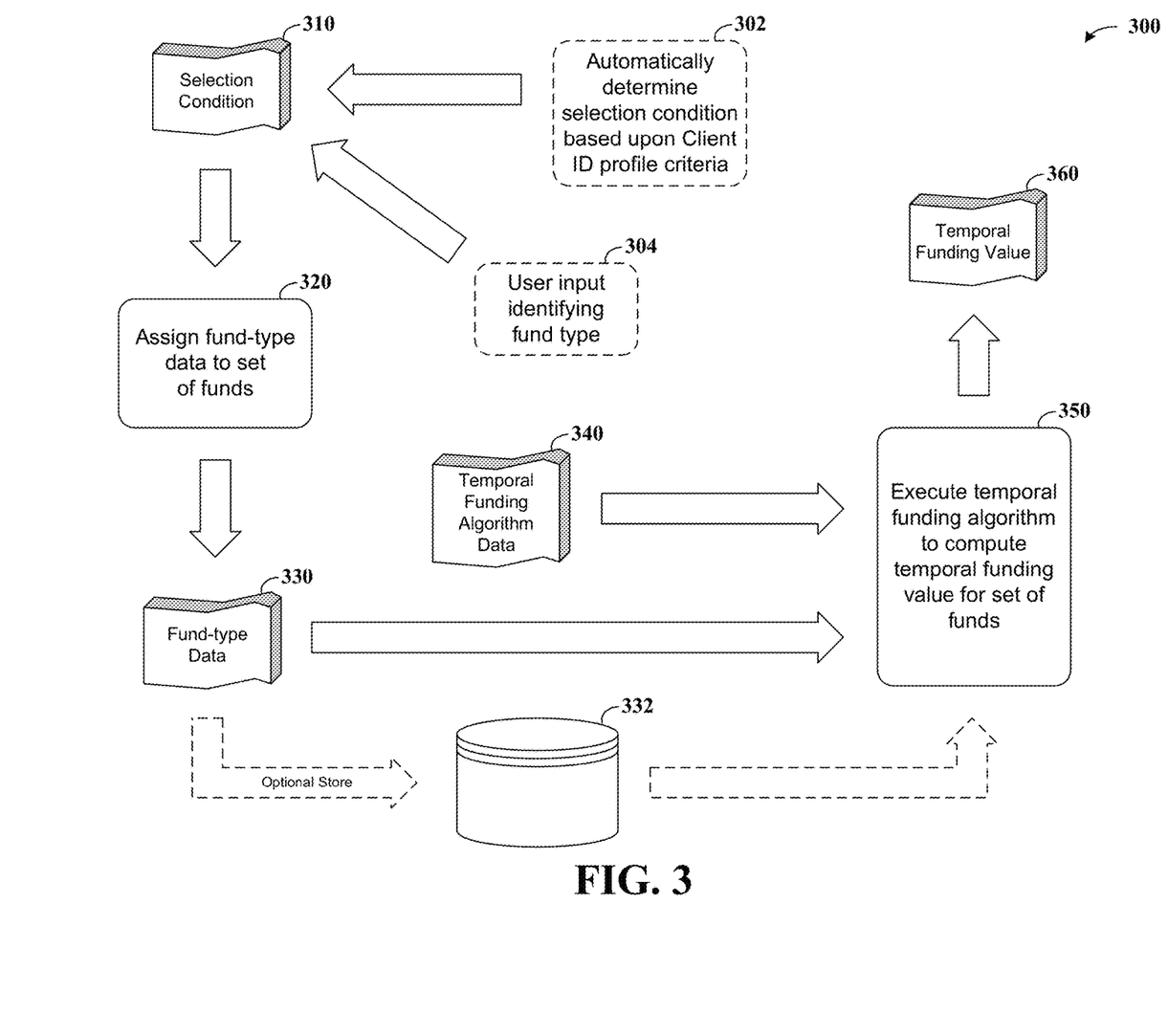
FIG. 3 shows a data flow diagram for determining a value, according to another example embodiment of the present invention.

FIG. 3 shows a data flow diagram for selecting and implementing a type (e.g., fund-type) for use in computing temporal funding information, in accordance with another example embodiment of the present invention. Such an approach may be implemented, for example, for determining a fund-type to use for applying funds, such as for applying funds to a 31-day puttable fund or to a longer-term fund/investment-type. Such investment types may, for example, include a Eurodollar investment (i.e., time deposit denominated in U.S. dollars at financial institutions outside of the United States, which may fall outside of the jurisdiction of the Federal Reserve). Such investment types may also, for example, include commercial paper, as an unsecured security/promissory note with a fixed maturity (e.g., greater than 31 days).

A fund-type selection condition 310 is provided and used at block 320 to assign fund-type data to a set of funds. The selection condition 310 may, for example, be automatically determined at block 302, such as by processing profile criteria for a client ID pertaining to a particular client to automatically determine a fund-type based on client-specific conditions. This approach may involve, for example, executing a selection algorithm, based on client-specific selection criteria and data pertaining to the fund-type assignment (e.g., fund amount, date and/or time, market conditions, or others). The selection condition 310 may also be obtained as a user input provided at block 304, such as by obtaining a client selection identifying a type of fund to be used.

Once a fund-type has been assigned at block 320, fund-type data 330 is provided as an indication of the type of funds to be assigned to a set of funds (or to different portions of a set of funds), such as by assigning fund-type data to data identifying an amount of funds and a client ID for a client to which the funds are attributed. The fund-type data 330 is processed, using temporal funding algorithm data 340, at block 350 to generate a temporal funding value 360 in a manner consistent, for example, with the approaches shown in and described in connection with FIGS. 1 and 2 or otherwise herein. In some instances, the fund-type data 330 is stored at a data storage circuit 332, such as one or more memory circuits.

In a more particular example embodiment involving FIG. 3 and the assignment of a set of funds to a puttable Eurodollar, the funds (data corresponding thereto) are processed as follows. A trade is placed with no specified maturity date (TFN), and interest is paid monthly (compounded or paid out). A put option is maintained for the client for the client ID assigned to the set of funds, with redemptions (puts) requiring a 31-day notice. When a put option is exercised, the put amount is set as a 31-day term deposit at a fixed rate during the 31-day term, with the rate being variable and subject to change (e.g., at financial institution discretion and/or based on funding needs and market rates). In some implementations, prepayments at a time prior to the expiration of a 31-day put period (with or without notice) may be effected with a penalty.

In another more particular example embodiment, referring to FIG. 3 and the assignment of a set of funds to a long-term type approach, such as with a Eurodollar or with commercial paper, funds are processed as follows. A contractual agreement is effected and implemented to hold the set of funds for a particular time period, which may be set using automatic/variable functions. Invested funds can be allocated in term and/or in tranches (e.g., in various portions or sub-sets of funds respectively assigned to securities), with the term (time period or periods) set accordingly and at a fixed rate for the term. A weighting is applied to each portion (e.g., tranche) as relative to an overall value of the set of funds. An overall investment rate for all funds is calculated and applied to the entire balance, using the weighting, and can be fixed or variable (e.g., if an overnight rate is applied).

In some implementations, the account structure for the set of funds is processed as one or more demand deposit accounts (DDAs) connected to individual long-term sweep investment accounts, with a summation of all accounts made to determine whether a contractually agreed-upon value has been fulfilled. On a nightly basis, funds in each DDA account are swept into a connected investment account and invested overnight into product according to a contract term. The next business day, the investment in each account matures and funds are returned to a connected DDA account, with funds permitted to move in and out of the DDA to facilitate daily business transactions. For tranches, the contractual deposit values fall as each tranche matures, with the fixed rate staying the same through final maturity of the contract/term, with the contract expiring when the last tranche matures. Funds remain in the DDA(s) until the end of the next business day, and the process is repeated, with interest earned and paid daily to the DDA.

The following describes various approaches to calculating a net fund value for a financial entity. These approaches may be carried out using one or more of the components as shown in FIGS. 1, 2 and 3, and as described above. A net fund value is computed for a financial entity using a value characterizing the entity's available funds (e.g., liquid funds) plus an aggregated value of client funds held by the entity, for which a temporal constraint applies. This computation is carried out using one or more approaches as described above and may involve, for example, transforming data by processing input data (e.g., temporal funding data and/or available funds data) and transforming the data into an output representing net value data for a financial entity.

In some embodiments, a value is set for a temporal constraint used for determining client-designated temporal funds by retrieving a stored value set to correspond to a regulatory entity-issued time period value for determining an available funds value for the financial entity. These temporal values may, for example, correspond to a financial product as described above. Other embodiments are directed to setting a value for the temporal constraint by computing a time period value, during which period funds attributed to the client entity ID can be attributed as temporal funds to the financial entity ID.

In various embodiments, a determination is made as to which client-designated funds can be used in a temporal funding calculation (e.g., at block 220 in FIG. 2) as follows. A participation algorithm is executed to determine a participation condition for a fund value attributable to the client entity ID using, as inputs, funding restriction data and available funds data for the client entity ID. A participation condition value is generated, which indicates that the client entity ID is a participating client entity ID, in response to the fund value exceeding a predefined threshold value set in accordance with the funding restriction data for the client entity ID.

In some embodiments, customer-specific rules (or other rules) are used to limit the amount of available funds attributable to temporally-available funds. For example, a participation algorithm can be executed as above with funding restriction data and available funds data for the client entity ID to determine an amount of available funds attributable to the client entity ID that are available for temporal funding for the financial entity. Another embodiment is directed to executing a participation algorithm to determine a participation condition using fund-category data indicative of a category of funds available for temporal funding, to determine an amount of available funds attributable to the client entity ID that are available for temporal funding for the financial entity.

Funding data may be evaluated to ensure that any determination of temporally-available funds is accurate on a conditional basis. In some embodiments, a current fund value for funds attributed to the financial entity ID is computed using a previously-computed net value of available funds, less expired funds having an availability that does not meet a temporal constraint.

Other embodiments are directed to computing an amount of funds available from a particular client using a prediction algorithm to predict liquid funds needed by the client over a time period corresponding to the regulatory period. This prediction can be effected by predicting a liquidity value for funds attributable to the client entity ID, and using the predicted liquidity value to determine an amount of available funds attributable to the client entity ID that are available for temporal funding for the financial entity.

Still other embodiments (as may be implemented with the above) are directed to determining a quantity of fund types for fund values that are in a qualifying category, and determining a participation condition based upon the relative quantity of fund types in the qualifying category relative to the quantity of fund types that are not in the qualifying category. For example, with a particular client, when a certain percentage of funds are in a qualifying category, all related funds may be available for use in a temporal computation. In other embodiments, such a categorical approach is used to determine a net funds value for a financial entity, by determining funds attributable to the financial entity across two or more clients and a related percentage as discussed above.

According to another example embodiment, elective client participation in temporal funding is facilitated as follows. A participation algorithm is executed to determine a participation condition for a fund value attributable to a client entity ID, by first determining an elective value of funds for which a client entity elects to participate in an elective temporal funding period, during which the client entity's access to the funds is restricted. For the determined elective value of funds, the funds are processed using a discount condition applied to the client entity.

The temporal period used to determine temporal funds availability can be set in a variety of manners. In some embodiments, a temporal period is set for a fund value attributable to the client entity ID, prior to executing the participation algorithm. The set temporal period is used as an input to the participation algorithm, and used to determine a participation condition for fund values.

The computed net fund value for a particular financial entity may be recalculated as needed. In another embodiment, in response to detecting a recalculation event condition pertaining to a change in a participation condition of funds for the net value of available funds, participation and temporal funding values are recomputed. This approach facilitates the determination of relevant data accordingly.

The various systems, circuits and methods described herein can be implemented using a variety of devices and methods. For example, logic circuits or processing circuits can be implemented using one or more of: discrete logic circuitry, fully-programmable and semi-programmable circuits such as PLAs (programmable logic arrays), specialized processors or general purpose processors that are specially programmed. Combinations of these and other circuit components are also possible and within the scope of various embodiments, including those discussed above. For example, systems consistent with the aspects shown in the figures could be implemented in a variety of circuit-based forms, such as through the use of data processing circuit modules (e.g., implemented via a discrete logic-based/CPU-based circuit, and/or via a group of CPU-executable instructions). For instance, such systems are exemplified by implementation in high-speed programmable computer/processor circuits that execute stored instructions to provide operations corresponding to the various blocks of FIG. 1, of FIG. 2 or of FIG. 3. Such a computer/processor may also be implemented in combination with discrete and or semi-programmable circuitry (e.g., as Field-Programmable Gate Arrays, Programmable Logic Devices/Arrays). Various ones of the illustrated blocks, and those functions discussed in text, can be implemented using integrated and nonintegrated approaches, e.g., with certain ones of the blocks located remotely and/or operated disparately relative to the other blocks.

Based upon the above discussion and illustrations, those skilled in the art will readily recognize that various modifications and changes may be made to the present invention without strictly following the exemplary embodiments and applications illustrated and described herein. For example, different terms, products, rules and related functions may be implemented in accordance with one or more embodiments. In addition, various computations and other functions shown as or described as carried out in a processor, logic circuit (which may or may not include a CPU) and/or other system, can be carried out using other circuit-based approaches. Such modifications do not depart from the true spirit and scope of the present invention, including that set forth in the following claims.

What is claimed is:

1. An apparatus for valuating and aggregating values for data relating to accounts to which access is temporally restricted and attributed to a plurality of client entities, comprising:

a memory circuit having entity data indicative of a current value for accounts attributed to an entity identification (ID), the entity ID being indicative of an entity, and client data for the plurality of client entities having attributed accounts controlled by the entity, each client entity respectively having a client entity ID;

a current value circuit configured and arranged to determine current value data from unrestricted data for accounts attributed to the entity ID using the entity data indicative of accounts attributed to the entity;

a client value circuit configured and arranged to, for each of the client entity IDs, determine a participation condition for a value attributable to the client entity ID using valuation data and the client data for the respective client entity ID;

a temporal value circuit configured and arranged to identify that the participation condition indicates accounts of the corresponding client entity are temporally restricted, and in response, execute a temporal funding function, using the value attributable to the client entity ID and a temporal constraint as inputs, to compute a temporal value from temporally-restricted data corresponding to at least a portion of the value attributable to the client entity ID for which access to the accounts by the corresponding client entity is temporally restricted;

an aggregation circuit configured and arranged to aggregate the computed temporal values for the client entity IDs to determine an aggregate temporal value for the entity ID corresponding to the temporally-restricted data; and a net value circuit configured and arranged to compute and output a net value of funds in available accounts for the entity based on the determined current value from unrestricted data, and the aggregated temporal value calculated from the temporally-restricted data, therein providing a net value exhibiting improved accuracy in mitigating errors in calculating total liquidity value via utilization of both the unrestricted data and the aggregated temporal value calculated from the temporally-restricted data.

2. The apparatus of claim 1, wherein the temporal value circuit is configured and arranged to establish the temporal constraint based on a regulatory entity-issued time period for maturity of accounts for the entity that specifies an upper limit for a run-off used in determining the net value of available accounts.

3. The apparatus of claim 1, wherein the temporal value circuit is configured and arranged to establish the temporal constraint based on a time period value associated with the client entity ID, during which period accounts attributed to the client entity ID are attributed as temporal accounts to the entity ID.

4. The apparatus of claim 1, wherein the client value circuit is configured and arranged to execute a participation function to determine the participation condition for the value attributable to the client entity ID by:

executing the participation function using, as inputs, restriction data and available account data for the client entity ID, the restriction data being indicative of a predefined threshold value that limits an amount of available accounts attributable to temporally-available accounts, and the available account data being indicative of an amount of funds that are available, and generating a participation condition value indicating that the client entity ID is a participating client entity ID in response to the value exceeding the predefined threshold value set in accordance with the restriction data for the client entity ID.

5. The apparatus of claim 4, wherein the temporal value circuit is configured and arranged to execute the temporal funding function by computing the temporal value using a temporal constraint that identifies a time period value for the accounts attributable to temporally-available accounts for which access by the corresponding client entity is temporally restricted.

6. The apparatus of claim 1, wherein the client value circuit is configured and arranged to execute a participation function to determine a participation condition for a value attributable to the client entity ID by executing the participation function with restriction data and available accounts data for the client entity ID to determine an amount of available accounts attributable to the client entity ID that are available for temporal funding for the entity.

7. The apparatus of claim 1, wherein the client value circuit is configured and arranged to execute a participation function to determine a participation condition for a value attributable to the client entity ID by executing the participation function with account-category data indicative of a category of accounts available for temporal funding to determine an amount of available accounts attributable to the client entity ID that are available for temporal funding for the entity.

8. The apparatus of claim 1, wherein the current value circuit configured and arranged to determine the current value data for accounts attributed to the entity ID is configured and arranged to use a previously computed net value of available accounts and, from the previously computed net value of available accounts, remove expired accounts attributed to the previously-computed net value of available accounts for the entity in response to the expired accounts having an availability that does not meet the temporal constraint.

9. The apparatus of claim 1, wherein the client value circuit is configured and arranged to execute a participation function to determine a participation condition for a value attributable to the client entity ID by executing a prediction function configured with client input data to predict a liquidity value for accounts attributable to the client entity ID over a period of time, and using the predicted liquidity value to determine an amount of available accounts attributable to the client entity ID that are available for temporal funding for the entity in the period of time.

10. The apparatus of claim 1, wherein the client value circuit is configured and arranged to execute a participation function to determine a participation condition for a value attributable to the client entity ID by determining a quantity of account types for the account value that are in a qualifying category, and determining the participation condition based upon the relative quantity of account types in the qualifying category relative to the quantity of account types that are not in the qualifying category.

11. The apparatus of claim 1, wherein the client value circuit is configured and arranged to execute a participation function to determine a participation condition for a value attributable to the client entity ID by:

determining an elective value of accounts for which a client entity elects to participate in an elective temporal funding period during which the client entity's access to the accounts is restricted, and for the determined elective value of accounts, processing the accounts using a discount condition applied to the client entity.

12. The apparatus of claim 1, wherein the apparatus is configured and arranged to detect a recalculation event condition pertaining to a change in a participation condition of accounts for the net value of available accounts, and in response to the detected recalculation event condition, repeat the steps of determining a participation condition, computing a temporal value, aggregating the computed temporal values, and computing a net value of available accounts.

13. The apparatus of claim 1, wherein the temporal value circuit is configured and arranged with the aggregation circuit, the net value circuit, and logic circuitry, to execute a temporal funding algorithm for compliance with financial terms used on behalf of a financial entity associated with the entity ID by computing a temporal fund value based on the net value output by the net value circuit and on a corresponding time period issued on behalf of the financial entity, wherein the corresponding time period is indicative of a time span during which certain access to the available account funds is temporally restricted.

14. The apparatus of claim 13, wherein the financial terms used on behalf of a financial entity are associated with at least one of or both: terms established by a financial services regulatory entity; and contractual terms involving the financial entity.

15. The apparatus of claim 13, wherein the temporal value circuit, the aggregation circuit and the net value circuit are configured and arranged to assess whether the net value qualifies relative to the financial terms by determining whether the net value meets a threshold value.

\* \* \* \* \*